March 9, 1926.
E. M. HEWLETT ET AL
1,576,189
SYSTEM FOR THE TRANSMISSION OF ANGULAR MOTION
Filed May 12, 1922
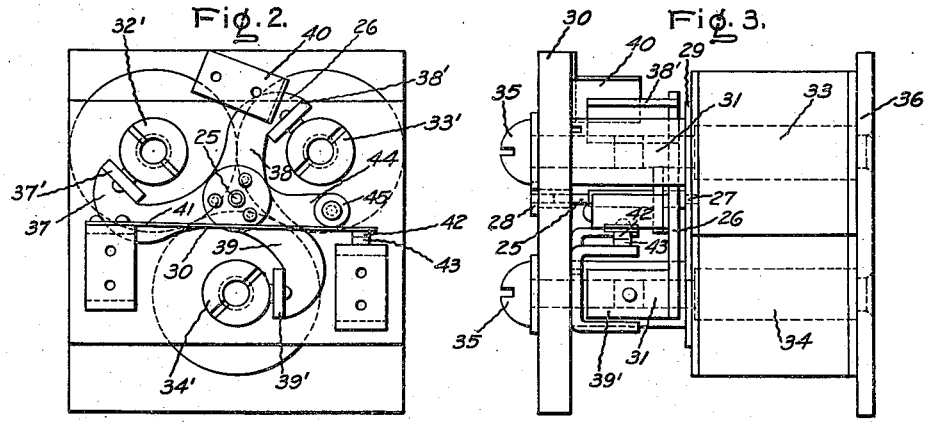
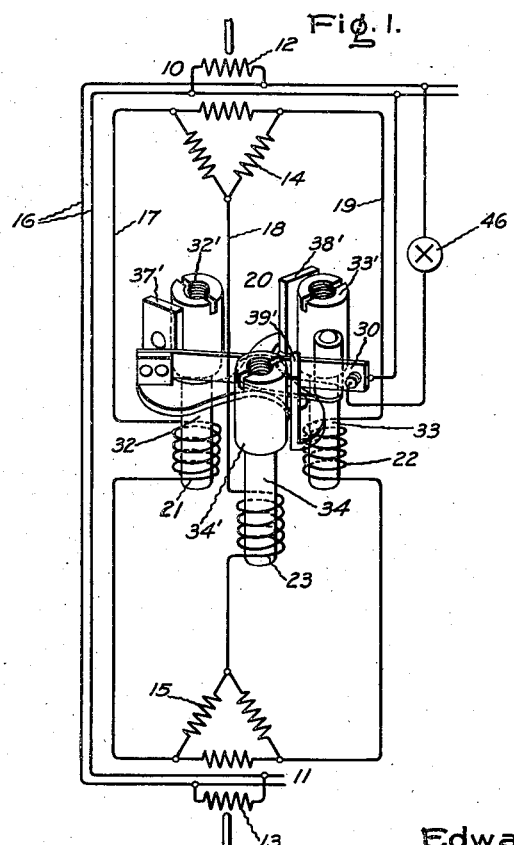
Inventors:
Edward M. Hewlett,
Waldo W. Willard,
by *Albert G. Davis*
Their Attorney.

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

SYSTEM FOR THE TRANSMISSION OF ANGULAR MOTION.

Application filed May 12, 1922. Serial No. 560,512.

*To all whom it may concern:*

Be it known that we, EDWARD M. HEWLETT and WALDO W. WILLARD, citizens of the United States, residing at Schenectady, county of Schenectady, State of New York, have invented certain new and useful Improvements in Systems for the Transmission of Angular Motion, of which the following is a specification.

Our invention relates to electrical systems for the transmission of angular motion and has for its object the provision of means for indicating abnormal conditions in such systems.

More specifically our invention relates to means for indicating angular disagreement between the transmitting and receiving devices, although it is useful also as a means of indicating other abnormal conditions causing excessive exchange of currents between the transmitting and receiving devices and whereby the operation of the devices would be affected.

In the operation of various electrical systems for the transmission of angular motion the amount of the exchange of current between the transmitting and receiving devices, under normal operating conditions, depends upon the angular relation of the devices. This current is zero when the devices are in angular agreement and increases depending upon the amount of angular disagreement.

In carrying out our invention we have interposed means in the electrical connections between the transmitting and receiving devices which is responsive to the exchange of current and hence to any angular disagreement between them for indicating a condition of angular disagreement. Furthermore, any failure of the electrical circuits or of the devices themselves for any reason whatever whereby their operation is affected in such a way as to cause excessive exchange currents is also immediately made known. Our invention therefore provides a constant source of information relative to the condition of the system.

For a better understanding of our invention, reference should be had to the accompanying drawing in which Fig. 1 shows in a diagrammatic fashion a system for the transmission of angular movement embodying our invention; Fig. 2 is a plan view of the electro-responsive device with the top plate removed; while Fig. 3 is an elevation view of the device shown in Fig. 2.

Referring to the drawing we have shown our invention in one form as applied to a "selsyn" system for the transmission of angular movement comprising a transmitting device 10 and a receiving device 11. The transmitting and receiving devices are similar in construction. They are provided with single phase field windings 12 and 13 and polycircuit armature windings 14 and 15 shown as three circuit delta connected windings. As shown in the drawing, the field windings are mounted on the rotors of these devices and the polycircuit armature windings on the stators, but obviously this relation may be reversed. The field windings are excited from a suitable source 16 of alternating current supply and are thereby caused to set up fields which interlink with their respective armature windings. Like points of the polycircuit armature windings are electrically connected by conductors 17, 18 and 19.

In the operation of systems of this character for the transmission of angular movement, when the transmitting and receiving devices are in corresponding angular positions the voltages induced in the armature windings are equal and opposite and there is therefore no exchange of current between them. Upon movement of the rotor of the transmitting device, however, this balanced voltage condition is disturbed with the result that currents are set up in the armature windings by reason of which a torque is applied to the rotor of the receiving device whereby it is caused to follow and repeat the movement applied to the transmitting device. The values of these armature currents depend directly upon the amount of the angular disagreement between the transmitting and receiving devices.

The principal feature of our present invention consists in providing means interposed in the electrical connections between the transmitting and receiving devices which is responsive to the exchange of currents so as to indicate a condition of angular disagreement. This means we have shown in the form of a relay 20 provided with three operating coils 21, 22, and 23 connected in circuit with conductors 17, 19, and 18 respectively. The operating coils are symmetrically arranged in parallel relation at 120 degree intervals about the axis of the supporting shaft 25 of a rotatable armature 26. Supporting bearings 27 and 28 for the ends of shaft 25 are provided in plates 29 and 30 (Fig. 2) extending transversely with relation to the axes of the coils. Plate 29 is made of a suitable non-magnetic material, such as brass, and is provided with apertures through which extend threaded portions 31 of reduced size on the ends of the cores 32, 33, and 34 for the coils 21, 22, and 23, the plate being clamped securely in place against the shoulders thus formed on the cores by cylindrical core extensions 32', 33', and 34'. These core extensions are provided with tapped central apertures by means of which they are screwed on the threaded portions and seated tightly on the plate 29. A plate 30, made of a suitable insulating material such as bakelite and forming the top plate of the relay, is secured to the outer ends of extensions 32', 33', and 34' by suitable screws 35. The armature 26 is thus mounted to rotate on its shaft 25 in a plane at right angles to the axes of the operating coils. A base plate 36 made of a suitable magnetic material, such as iron, mechanically and magnetically connects the cores 32, 33 and 34 at their left hand ends.

The armature 26 comprises three symmetrically spaced arms 37, 38, and 39 extending from the supporting shaft 25. On the ends of these arms are upturned projections 37', 38' and 39' (Fig. 2) which are adapted to engage with the core extensions 32', 33' and 34' upon rotation of the armature in a clockwise direction. A stop 40 secured to plate 30 in the path of projection 38' is provided to limit the rotation of the armature in the opposite direction.

Carried by plate 30 adjacent the armature 26 is a resilient contact arm 41 provided on its free end with a contact 42 which cooperates with a fixed contact 43 also carried by plate 30. On the armature 26 is an arm 44 provided with a roller 45 which normally engages the contact arm 41. The contacts 42 and 43 are in circuit with suitable indicating means, such as a lamp 46 (Fig. 1) shown connected to supply circuit 16. The contact arm 41 normally biases contact 42 a slight distance from stationary contact 43 so as to maintain the circuit of the indicating device 46 open, and consequently holds armature 26 in such position that projections 37', 38' and 39' are spaced a corresponding distance from the adjacent core extensions, projection 38' then resting in engagement with stop 40.

As thus constructed and arranged the operation of our invention is as follows: As long as the receiving device 11 is in a corresponding angular position with relation to the transmitting device 12 and not subject to other abnormal causes of excessive exchange currents, there will be no flow of current in the armature circuits, and consequently the operating coils of the relay will not be energized. Under these conditions the operating coils will not exert any torque on the armature 26 tending to turn it, and contacts 42 and 43 will therefore be separated maintaining open the circuit of the indicating lamp 46. Upon rotation of the transmitting device, currents will be set up flowing through certain of the operating coils of the relay, the values of which depend on the amount of angular disagreement between the transmitting and receiving devices. A torque will thus be exerted on the armature 26, which torque is transmitted through arm 44 to the contact arm 41, and should for any reason whatever, such as by sticking of the mechanism driven by the receiving device, the amount of this angular disagreement reach a predetermined value for which the relay has been set or calibrated, the force tending to rotate the armature will be great enough to overcome the bias of switch arm 41 and move contact 42 into engagement with contact 43. The circuit for indicating lamp 46 will thus be closed whereby the lamp will burn, giving an indication of the condition of angular disagreement in the system. It will be understood that under normal conditions of operation the current in the relay operating coils will not be great enough to cause armature 26 to close the indicator circuit. This normal operating current is only just sufficient to cause the receiving device to follow the transmitting device.

Upon the occurrence also of other abnormal conditions causing excessive current flow through the coils of the relay, such as a short circuit around the field or armature winding of one of the devices or a break in one of the field circuits, an indication will be given by lamp 46. It will be understood that such abnormal conditions also affect the operation of the system, resulting in angular disagreement between the transmitting and receiving devices.

While we have described our invention as embodied in concrete form and as operating in a specific manner in accordance with the provisions of the Patent Statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is,—

1. A system for the transmission of angular motion comprising an electrical transmitting device, an electrical receiving device responsive to movement of said transmitting device, electrical connections between said devices in which currents are set up upon angular disagreement between them, and indicating means actuated by the combined effects of said currents in such manner as to be operated upon the occurrence of a predetermined maximum current in any one of said connections.

2. A system for the transmission of angular motion comprising a transmitting device having armature and field windings, a receiving device having similar windings and responsive to movement of said transmitting device, a source of alternating current supply for said field windings whereby alternating electromotive forces are induced in said armature windings, electrical connections between like points of said armature windings in which currents of unequal magnitudes are set up upon angular disagreement of the moving elements of said devices, an indicating device, means responsive to the aggregate value of said currents for operating said indicating device, said means being arranged to operate said indicating device only when said aggregate value becomes greater than a predetermined amount.

3. A system for the transmission of angular motion comprising an electrical transmitting device, an electrical receiving device responsive to movement of said transmitting device, polycircuit armature and single circuit field windings for said devices, a source of alternating current supply for said field windings, electrical connections between said armature windings in which currents of varying magnitudes are set up upon angular disagreement of said devices, and indicating means actuated by the combined effects of said currents in such manner as to be operated upon the occurrence of a predetermined maximum current in any one of said connections.

4. A system for the transmission of angular motion comprising an electrical transmitting device, an electrical receiving device responsive to movement of said transmitting device, three-circuit armature and single circuit field windings for said devices, a source of alternating current supply for said field windings, electrical connections between like points of said armature windings in which currents of unequal and varying magnitudes are set up upon angular disagreement of said devices, operating coils in said connections, and means operated by said coils when the aggregate value of said currents become greater than a predetermined amount to indicate abnormal conditions affecting the operation of the system.

5. A system for the transmission of angular motion comprising an electrical transmitting device, an electrical receiving device responsive to movement of said transmitting device, electrical connections between said devices in which currents of unequal and varying magnitudes are set up by said devices upon angular disagreement between them, a movable armature, a plurality of operating coils associated with said armature included in the connections between said devices in such manner that the force acting on said armature is proportional to the aggregate value of the currents in said coils, means for preventing movement of said armature except upon the occurrence of a predetermined condition of angular disagreement between said devices, and indicating means operated by movement of said armature.

6. A system for the transmission of angular motion comprising an electrical transmitting device, an electrical receiving device responsive to movement of said transmitting device polycircuit armature and single circuit field windings for said devices, a source of alternating current supply for said field windings, electrical connections between said armature windings in which currents are set up upon angular disagreement of the moving elements of said devices, a movable armature, a plurality of operating coils included in the connections between said armature windings cooperating with said armature whereby said armature is responsive to the aggregate value of the currents in said coils, means for preventing movement of said armature except upon the occurrence of a predetermined condition of angular disagreement between the moving elements of said devices, and indicating means operated by movement of said armature.

7. A system for the transmission of angular motion comprising an electrical transmitting device, an electrical receiving device responsive to movement of said transmitting device, electrical connections between said devices in which currents are set up by said devices upon angular disagreement between them, a rotatably mounted armature, equally spaced radial arms on said armature, a plurality of electromagnets having pole pieces cooperating with said arms respectively, said electromagnets being included in the connections between said devices whereby said armature is responsive to the combined effects of the currents exchanged between said devices, means for preventing movement of said armature except upon the occurrence of a predetermined condition of angular disagreement between said devices, an electrical indicating device, and a resilient contact arm engaged by said armature and moved to close the circuit of said indicating device upon movement of said armature.

In witness whereof we have hereunto set our hands this 8th day of May, 1922.

EDWARD M. HEWLETT.
WALDO W. WILLARD.